United States Patent [19]
Jones

[11] Patent Number: 5,934,016
[45] Date of Patent: Aug. 10, 1999

[54] BOUQUET HOLDER ASSEMBLY FOR BOUQUET DISPLAY APPARATUS

[76] Inventor: Jill Marie Jones, 361 Beaver St., Leetsdale, Pa. 15056-1136

[21] Appl. No.: 09/049,703

[22] Filed: Mar. 28, 1998

Related U.S. Application Data

[60] Provisional application No. 60/042,149, Mar. 31, 1997, and provisional application No. 60/042,150, Mar. 31, 1997.

[51] Int. Cl.⁶ ..................................................... A01G 5/00
[52] U.S. Cl. ........................... 47/41.01; 47/41.01; 47/39; 47/41.11; 47/41.12; 47/41.13; 47/41.15; 47/68; 47/40; 119/61; 119/74; D11/147; D11/143; 428/23; 428/24; 248/27.8
[58] Field of Search .......................... 47/41.01, 39, 41.11, 47/41.12, 41.13, 41.15, 68, 40; 119/61, 74; D11/147, 143; 428/23, 24; 248/27.8

[56] References Cited

U.S. PATENT DOCUMENTS

| | | | |
|---|---|---|---|
| D. 317,884 | 7/1991 | Spicer | D11/147 |
| 2,553,103 | 5/1951 | Miller | 248/27.8 |
| 2,658,709 | 11/1953 | Kendall | 119/61 |
| 2,760,052 | 8/1956 | Owen | 428/23 |
| 2,765,585 | 10/1956 | Smithers | 47/41.12 |
| 3,711,048 | 1/1973 | Thalenfeld | 47/41.13 |
| 4,011,951 | 3/1977 | Boyer | 211/71 |
| 4,418,496 | 12/1983 | Koistinen | 47/41.12 |
| 4,566,221 | 1/1986 | Kossin | 47/41.12 |
| 5,070,644 | 12/1991 | Hasty | 47/41.12 |
| 5,366,192 | 11/1994 | Carroll | 248/27.8 |
| 5,414,957 | 5/1995 | Kenney | 47/41.12 |
| 5,450,690 | 9/1995 | Elsea | 47/41.01 |
| 5,456,046 | 10/1995 | Vitalune et al. | 47/41.01 |
| 5,787,638 | 8/1998 | Harshman | 47/41.12 |

*Primary Examiner*—Jack W. Lavinder
*Assistant Examiner*—Yvonne R. Abbott

[57] ABSTRACT

A bouquet holder module is provided for a bouquet display apparatus which includes an adjustable clamp assembly and a bracket assembly supported by the adjustable clamp assembly, wherein the bracket assembly includes a module holder portion. More specifically, the bouquet holder module includes a bracket assembly attachment portion which includes a bracket attachment frame and a bracket attachment channel defined by the bracket attachment frame. A bouquet retention portion is connected to the bracket assembly attachment portion. The bouquet retention portion includes a bouquet retention frame and bouquet retention channel defined by the bouquet retention frame. A bouquet holder assembly can be supported by the bouquet holder module. The bouquet holder assembly includes a tapered insertion shaft/handle and a cushion-containing head supported by the insertion shaft/handle. The cushion-containing head is tilted at approximately a forty-five degree angle in a direction away from the adjustable clamp assembly. In accordance with another embodiment of the invention, a bouquet holder assembly is provided which includes a bracket attachment frame and a bracket attachment channel defined by the bracket attachment frame. A handle includes a proximal handle end which is connected to the bracket attachment frame. A cushion-containing head is supported by the handle. The handle is oriented with respect to a bottom side of the bracket attachment frame at an obtuse first orientation angle. The cushion-containing head is tilted with respect to the proximal handle end at an acute second orientation angle.

14 Claims, 5 Drawing Sheets

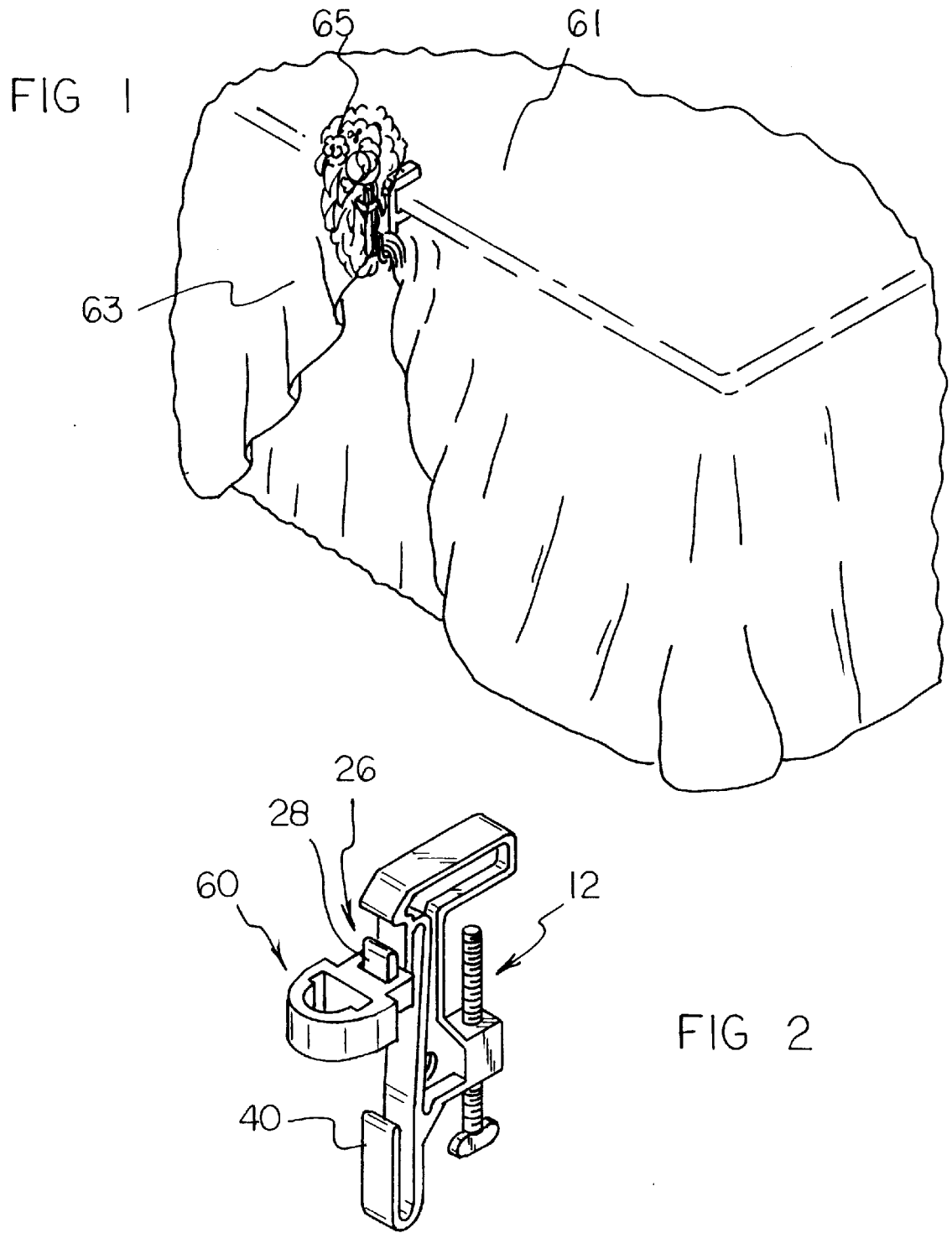

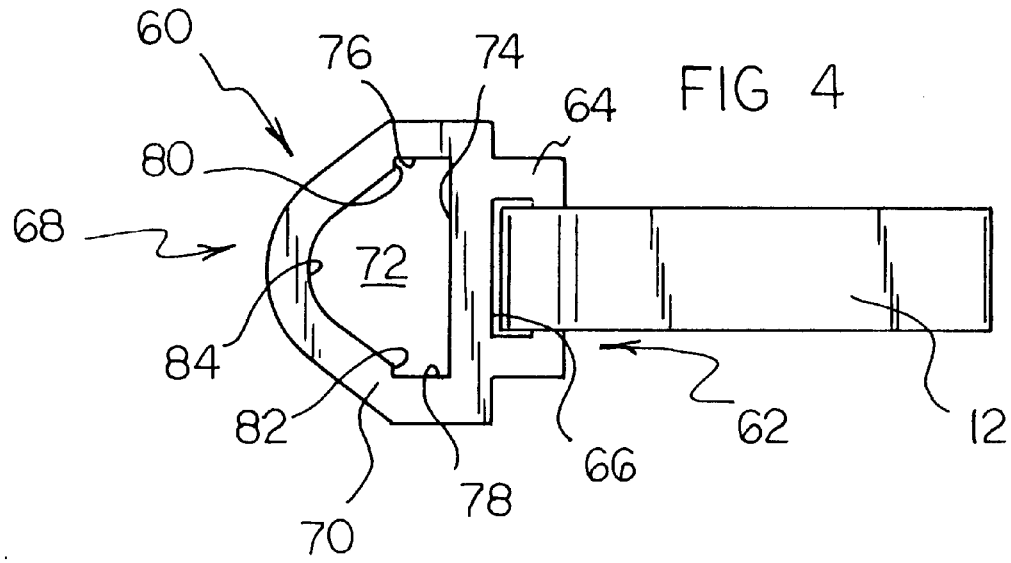
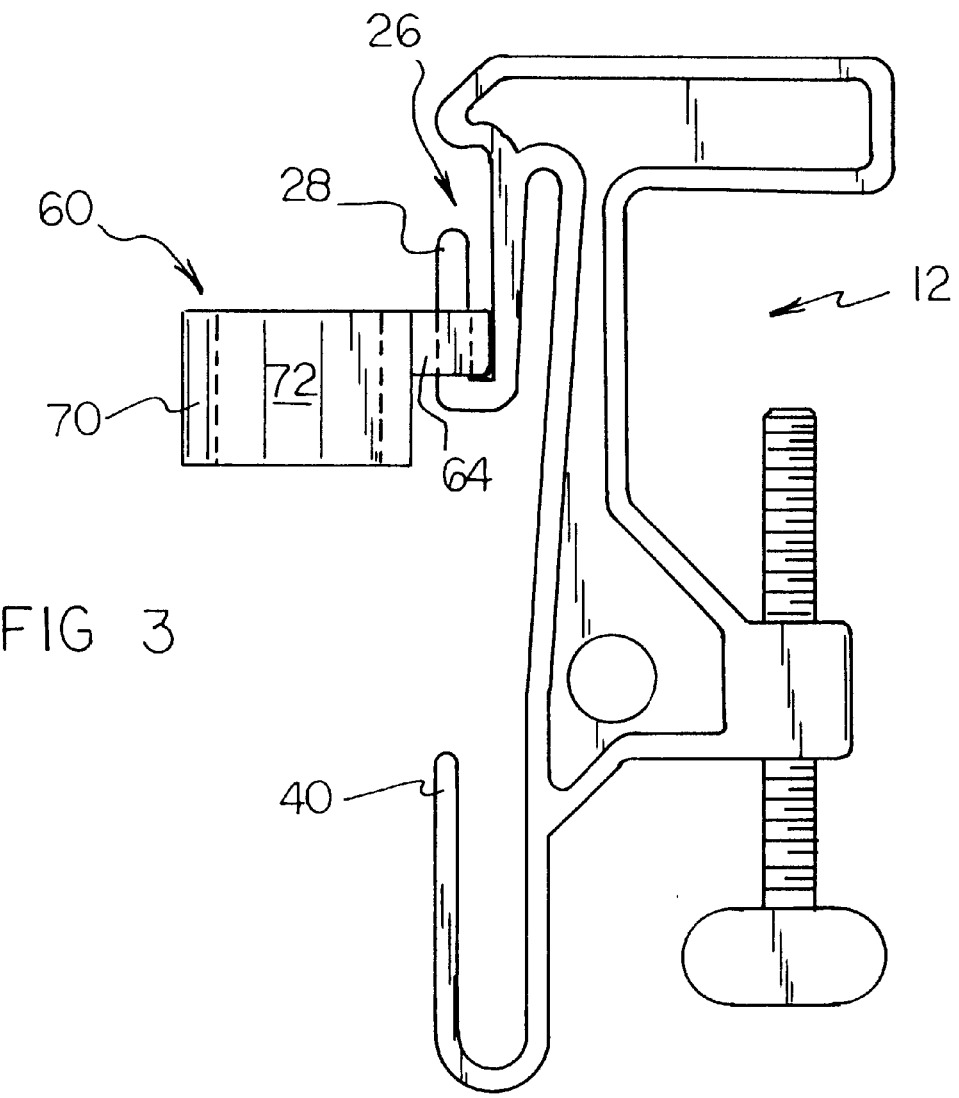

5,934,016

BOUQUET HOLDER ASSEMBLY FOR BOUQUET DISPLAY APPARATUS

CROSS-REFERENCE TO RELATED APPLICATIONS

This application claims priority based upon my copending Provisional Application Serial No. 60/042,149, filed Mar. 31, 1997 and my copending Provisional Application Serial No. 60/042,150, filed Mar. 31, 1997.

BACKGROUND OF THE INVENTION

1. Field of the Invention

The present invention relates generally to devices for displaying flowers and bouquets and, more particularly, to flower and bouquet display devices especially adapted for displaying the flowers and bouquets in association with a table.

2. Description of the Prior Art

This patent contains improvements to the flower and bouqet display apparatus set forth in U.S. Pat. No. 5,456,046 of the same inventor herein. In this respect, U.S. Pat. No. 5,456,046 is incorporated herein by reference. Although the flower and bouquet display devices disclosed in U.S. Pat. No. 5,456,046 have many desirable features as explained in that patent, the present inventor has discovered still other features that would be desirable in a flower and bouquet display device. For example, with a flower and bouquet display device associated with a table, it would be desirable if a device were provided which permitted the alternate receipt of a variety of handle-containing bouquet holders. More specifically, in this respect, it would be desirable if a flower and bouquet display device were provided which included a single modular structure which permits the alternate receipt of a variety of handle-containing bouquet holders. In addition, it would be desirable if a flower and bouquet display device were provided in which the handle-containing bouquet holders have tapered handles which fit into the modular handle-receiving structure for providing a wedging fit between the handle and the handle-receiving structure.

Often, flower bouquets have pins for attaching the respective bouquets to objects that can receive the respective pins. In this respect, it would be desirable if a flower and bouquet display device that is assocated with a table were provided with a structure that receives the pins of pin-containing bouquets. Moreover, it would be desirable if such a pin-receiving structure could be tilted at a desired display angle for displaying the pinned on bouquet.

Thus, while the above-mentioned U.S. Pat. No. 5,456,04 discloses the use of a bouquet display device associated with a table, U.S. Pat. No. 5,456,046 does not teach or suggest a bouquet holder and display apparatus which has the following combination of desirable features: (1) permits the alternate receipt of a variety of handle-containing bouquet holders; (2) includes a single modular structure which permits the alternate receipt of a variety of handle-containing bouquet holders; (3) provides bouquet holders which have tapered handles which fit into the modular handle-receiving structure for providing a wedging fit between the handle and the handle-receiving structure; (4) provides a structure that receives the pins of pin-containing bouquets; and (5) provides a pin-receiving structure which can be tilted at a desired display angle for displaying the pinned on bouquet.

The foregoing desired characteristics are provided by the unique bouquet holder assembly for bouquet display apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a bouquet holder module for a bouquet display apparatus which includes an adjustable clamp assembly and a bracket assembly supported by the adjustable clamp assembly, wherein the bracket assembly includes a module holder portion. More specifically, the bouquet holder module includes a bracket assembly attachment portion which includes a bracket attachment frame and a bracket attachment channel defined by the bracket attachment frame. A bouquet retention portion is connected to the bracket assembly attachment portion. The bouquet retention portion includes a bouquet retention frame and bouquet retention channel defined by the bouquet retention frame. The bouquet retention frame includes a planar first interior wall, a planar second interior wall projecting perpendicularly from a first end of the planar first interior wall, a planar third interior wall projecting perpendicularly from a second end of the planar first interior wall, a planar fourth interior wall projecting inward and perpendicular from the planar second interior wall, a planar fifth interior wall projecting inward and perpendicular from the planar third interior wall, and a concavely curved sixth interior wall extending from an innermost end of the planar fourth interior wall to an innermost end of the planar fifth interior wall.

A bouquet holder assembly can be supported by the bouquet holder module. The bouquet holder assembly includes an insertion shaft/handle and a cushion-containing head supported by the insertion shaft/handle. The cushion-containing head is tilted in a direction away from the adjustable clamp assembly. The cushion-containing head may be comprised of a plastic foam material. The cushion-containing head is tilted approximately forty-five degrees with respect to the insertion shaft/handle. The insertion shaft/handle is tapered for ease of initial insertion into the bouquet retention channel and for a wedging action when inserted further into the bouquet retention channel. The cushion-containing head can be in a form of a hemisphere, a cylinder, or any other suitable shape.

In accordance with another embodiment of the invention, a bouquet holder assembly is provided for a bouquet display apparatus which includes an adjustable clamp assembly and a bracket assembly supported by the adjustable clamp assembly, wherein the bracket assembly includes a module holder portion. The bouquet holder assembly includes a bracket assembly attachment portion which includes a bracket attachment frame and a bracket attachment channel defined by the bracket attachment frame. A handle includes a proximal handle end which is connected to the bracket attachment frame. A cushion-containing head is supported by the handle. The handle is oriented with respect to a bottom side of the bracket attachment frame at an obtuse first orientation angle. The cushion-containing head is tilted with respect to the proximal handle end at an acute second orientation angle. The cushion-containing head includes a quantity of a plastic foam material. The cushion-containing head also includes retention strips for retaining the plastic foam material.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a number of embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bouquet holder assembly for bouquet display apparatus which has all of the advantages of the prior art and none of the disadvantages.

It is another object of the present invention to provide a new and improved bouquet holder assembly for bouquet display apparatus which may be easily and efficiently manufactured and marketed.

It is a further object of the present invention to provide a new and improved bouquet holder assembly for bouquet display apparatus which is of durable and reliable construction.

An even further object of the present invention is to provide a new and improved bouquet holder assembly for bouquet display apparatus which is susceptible of a low cost of manufacture with regard to both materials and labor, and which accordingly is then susceptible of low prices of sale to the consuming public, thereby making such bouquet holder assembly for bouquet display apparatus available to the buying public.

Still yet a further object of the present invention is to provide a new and improved bouquet holder assembly for bouquet display apparatus which permits the alternate receipt of a variety of handle-containing bouquet holders.

Still another object of the present invention is to provide a new and improved bouquet holder assembly for bouquet display apparatus that includes a single modular structure which permits the alternate receipt of a variety of handle-containing bouquet holders.

Yet another object of the present invention is to provide a new and improved bouquet holder assembly for bouquet display apparatus which provides bouquet holders which have tapered handles which fit into the modular handle-receiving structure for providing a wedging fit between the handle and the handle-receiving structure.

Even another object of the present invention is to provide a new and improved bouquet holder assembly for bouquet display apparatus that provides a structure that receives the pins of pin-containing bouquets.

Still a further object of the present invention is to provide a new and improved bouquet holder assembly for bouquet display apparatus which provides a pin-receiving structure which can be tilted at a desired display angle for displaying the pinned on bouquet.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first embodiment of the bouquet holder for bouquet display apparatus of the invention in use with a bracket assembly supported by an adjustable clamp assembly which is attached to a table and which is being used to hold the skirt of a tablecloth.

FIG. 2 is a perspective view of the embodiment of the bouquet holder for bouquet display apparatus shown in FIG. 1 still in use with a bracket assembly supported by an adjustable clamp assembly, but removed from the table and the tablecloth.

FIG. 3 is an enlarged side view of the invention, the bracket assembly, and the clamp assembly shown in FIG. 2.

FIG. 4 is a top view of the embodiment of the invention shown in FIG. 3.

DESCRIPTION OF THE PREFERRED EMBODIMENTS

Figure 5:
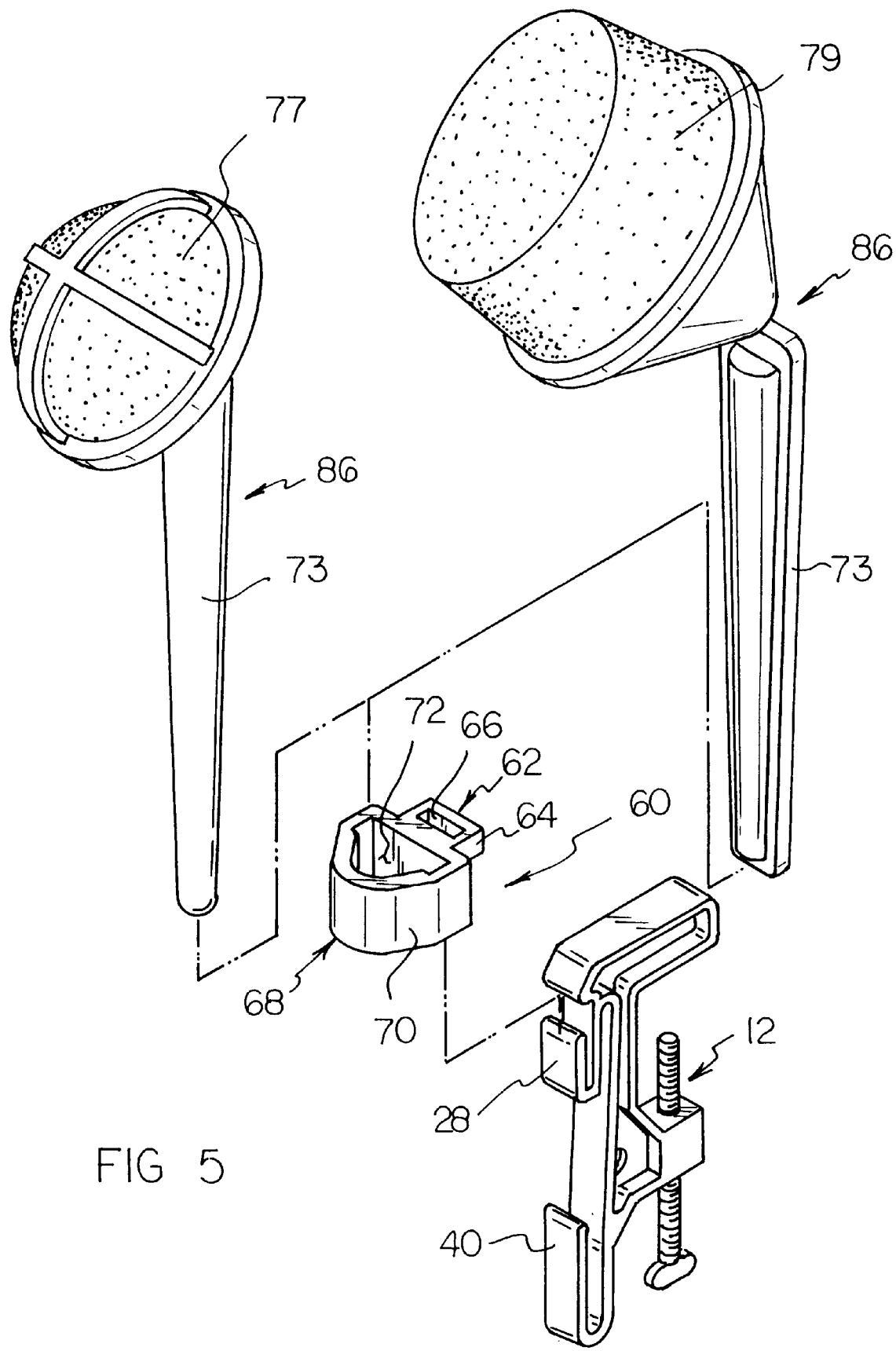
FIG. 5 is an exploded perspective view of the embodiment of the invention shown in FIG. 2 with further illustration of two different bouquet holders of the invention.
Figure 6:
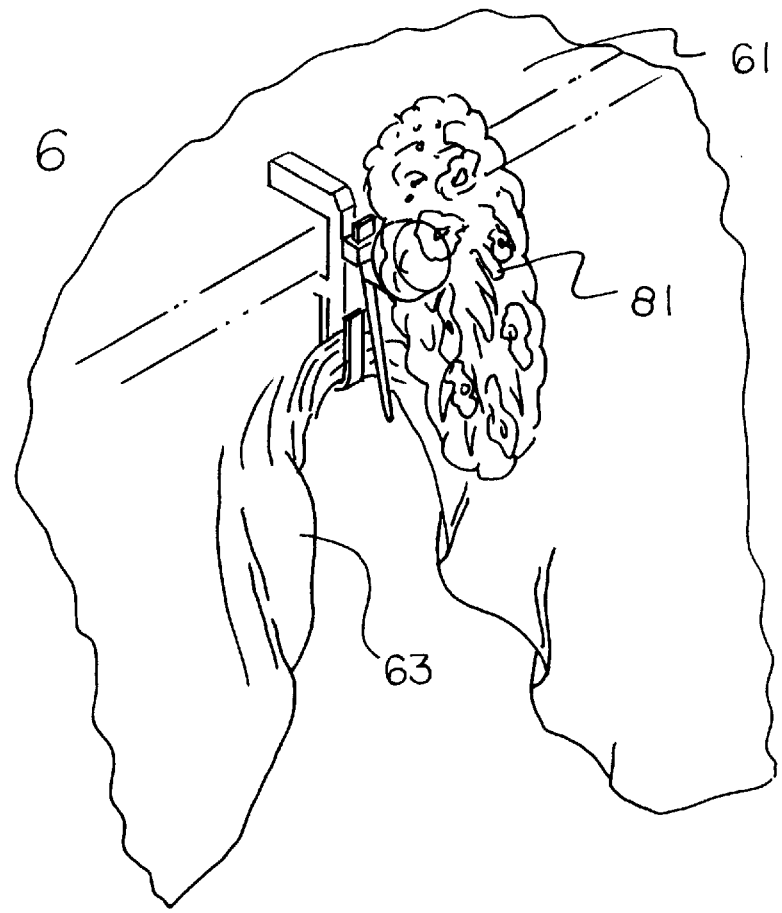
FIG. 6 is a perspective view showing a second embodiment of the bouquet holder assembly of the invention in use with a bracket assembly supported by an adjustable clamp assembly which is attached to a table and which is being used to hold the skirt of a tablecloth.
Figure 7:
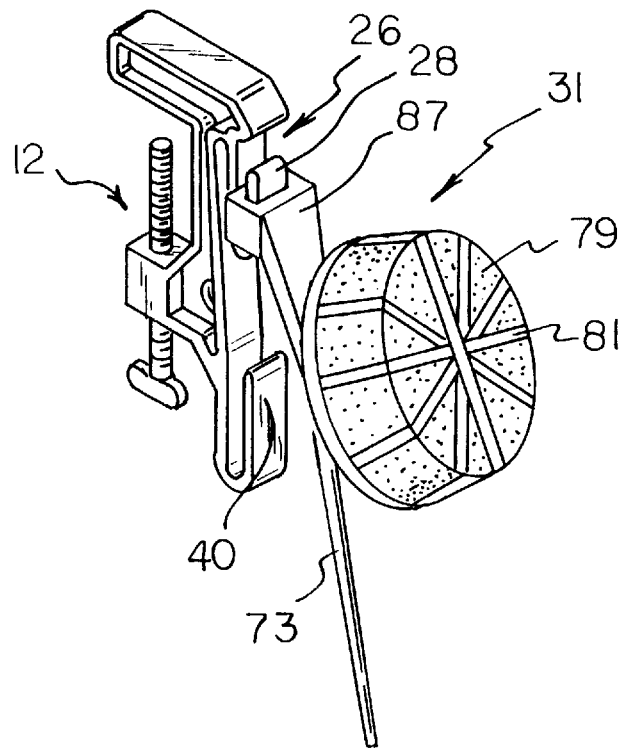
FIG. 7 is a perspective view of the embodiment of the bouquet holder assembly of the invention for the bouquet display apparatus shown in FIG. 6 still in use with a bracket assembly supported by an adjustable clamp assembly, but removed from the table and the tablecloth.
Figure 9:
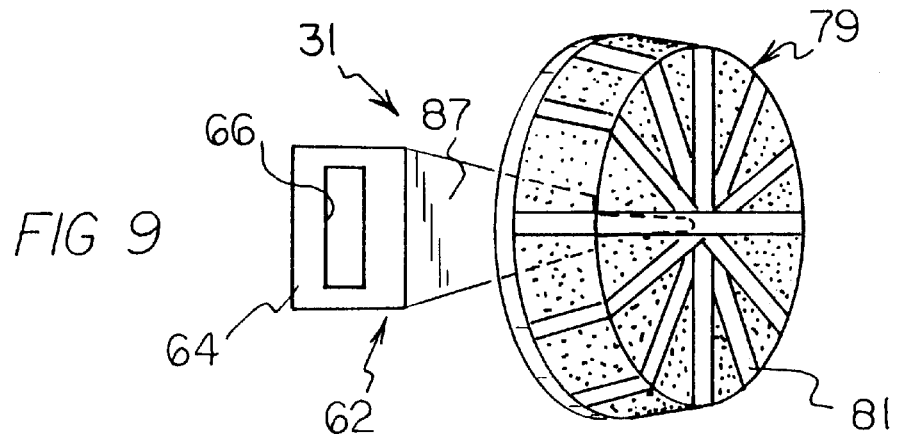
FIG. 9 is a top view of the embodiment of the invention shown in FIG. 8.
Figure 8:
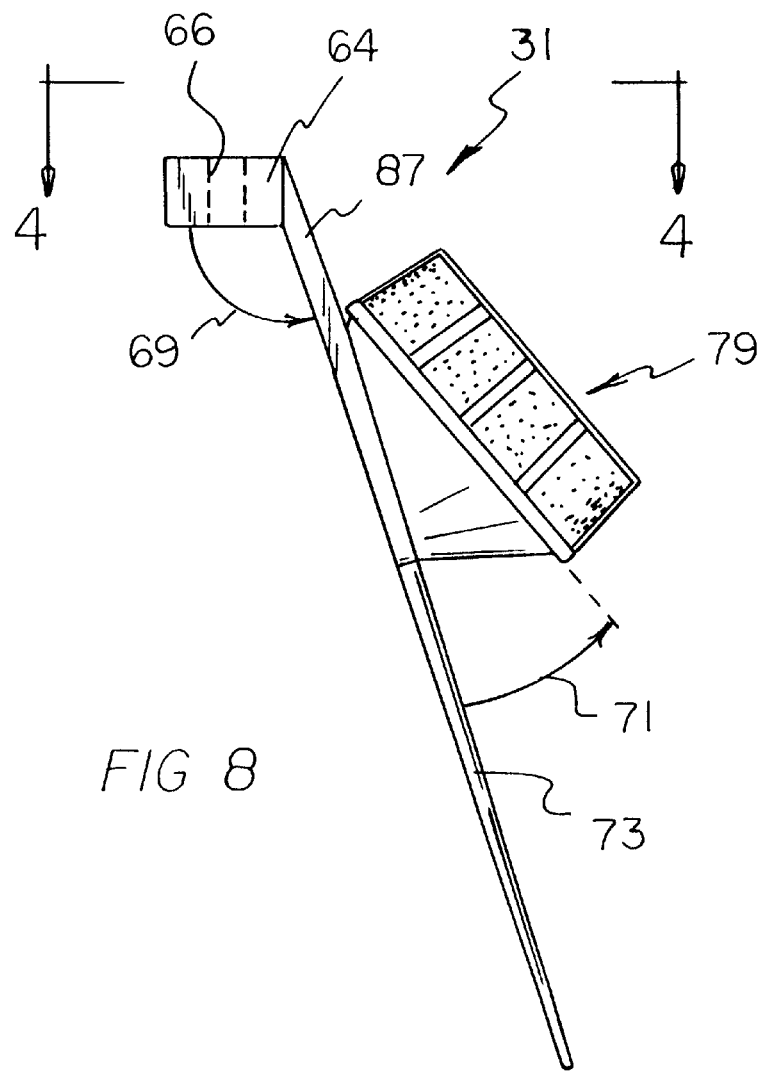
FIG. 8 is an enlarged side view of the embodiment of the invention shown in FIGS. 6 and 7 removed from the bracket assembly and the clamp assembly shown in FIGS. 6 and 7.

With reference to the drawings, a new and improved bouquet holder assembly for bouquet display apparatus embodying the principles and concepts of the present invention will be described.

Turning to FIGS. 1–5, there is shown a first embodiment of the bouquet holder for bouquet display apparatus of the invention generally designated by reference numeral 60. In the first embodiment, bouquet holder for bouquet display apparatus 60 is provided for a bouquet display apparatus disclosed in U.S. Pat. No. 5,456,046, incorporated herein by reference, which includes an adjustable clamp assembly 12 and a bracket assembly 26 supported by the adjustable clamp assembly 12, wherein the bracket assembly 26 includes a module holder portion 28. More specifically, the bouquet holder module 60 includes a bracket assembly attachment portion 62 which includes a bracket attachment frame 64 and a bracket attachment channel 66 defined by the bracket attachment frame 64. A bouquet retention portion 68 is connected to the bracket assembly attachment portion 62. The bouquet retention portion 68 includes a bouquet retention frame 70 and bouquet retention channel 72 defined by the bouquet retention frame 70. The bouquet retention frame 70 includes a planar first interior wall 74, a planar second interior wall 76 projecting perpendicularly from a first end of the planar first interior wall 74, a planar third interior wall 78 projecting perpendicularly from a second end of the planar first interior wall 74, a planar fourth interior wall 80 projecting inward and perpendicular from the planar second interior wall 76, a planar fifth interior wall 82 projecting inward and perpendicular from the planar third interior wall 78, and a curved sixth interior wall 84 extending from an innermost end of the planar fourth interior wall 80 to an innermost end of the planar fifth interior wall 82.

To use the bouquet holder module 60 of the invention, an adjustable clamp assembly 12, such as disclosed in U.S. Pat. No. 5,456,046, is clamped onto a table 61. In accordance with the concept that a patent application can serve to define terms used therein, the term "vit" is hereby defined to coincide with the bracket assembly attachment portion 62 of the invention which includes the bracket attachment frame 64 and the bracket attachment channel 66. A skirt 63 of a tablecloth can be hung from a skirt holder assembly 40 attached to the adjustable clamp assembly 12. The bouquet holder module 60 is obtained, and the bracket attachment channel 66 is aligned with the module holder portion 28 of the bracket assembly 26. Then, the bouquet holder module 60 is lowered so that the bracket attachment frame 64 supports the bouquet holder module 60 on the module holder portion 28. Then, stems of a bunch of flowers 65 can be lowered into the bouquet retention channel 72 of the bouquet retention portion 68 of the bouquet holder module 60.

Further in accordance with using the bouquet holder module 60 of the invention, as indicated in FIG. 5, bouquet holder assembly 86 can be supported by the bouquet holder module 60. The bouquet holder assembly 86 includes an insertion shaft/handle 73, and a cushion-containing head supported by the insertion shaft/handle 73. The cushion-containing head is tilted in a direction away from the adjustable clamp assembly 12. The cushion-containing head is comprised of a plastic foam material. The cushion-containing head is tilted approximately forty-five degrees with respect to the insertion shaft/handle 73. The insertion shaft/handle 73 is tapered for ease of initial insertion into the bouquet retention channel 72 and for a wedging action when inserted further into the bouquet retention channel 72. As shown in FIG. 5, the cushion-containing head can be in a form of a hemisphere 77. Alternatively, the cushion-containing head can be in a form of a cylinder 79.

The bouquet holder assembly 86 can used as follows. A bouquet (not shown), that has a pin, can be attached to a cushion-containing head that is either in the form of a hemisphere 77 or a outside-facing surface 79, or any other suitable shape, by placing the pin into the cushion-containing head. The insertion shaft/handle 73 can be grasped by a person, such as a bride, and the insertion shaft/handle 73 can be used for carrying the pinned bouquet. The forty-five degree tilt of the cushion-containing head with respect to the insertion shaft/handle 73 allows for a pinned bouquet to face forward as the bride carries the bouquet. After the bride is finished carrying the bouquet, the insertion shaft/handle 73 can be inserted into the bouquet retention channel 72 of the bouquet holder module 60, and the bouquet can be displayed at the table 61 by being retained by the bouquet holder module 60 and by being supported on the table 61 by the adjustable clamp assembly 12.

When a tapered insertion shaft/handle 73 is inserted into a bouquet retention channel 72, the insertion shaft/handle 73 can be wedged into the bouquet holder module 60 and secured thereto. If and when desired, the insertion shaft/handle 73 can be pulled out of the bouquet retention channel 72, and the insertion shaft/handle 73 can be used as a handle again for carrying a bouquet pinned to the cushion-containing head.

Turning to FIGS. 6–9, there is shown a second embodiment of the bouquet holder assembly for bouquet display apparatus of the invention generally designated by reference numeral 31. In the second embodiment, bouquet holder assembly 31 is provided for a bouquet display apparatus disclosed in U.S. Pat. No. 5,456,046, incorporated herein by reference, which includes an adjustable clamp assembly 12 and a bracket assembly 26 supported by the adjustable clamp assembly 12, wherein the bracket assembly 26 includes a module holder portion 28. The bouquet holder assembly 31 includes a bracket assembly attachment portion 62 which includes a bracket attachment frame 64 and a bracket attachment channel 66 defined by the bracket attachment frame 64. A handle 73 includes a proximal handle end 87 which is connected to the bracket attachment frame 64. A cushion-containing head 79 is supported by the handle 73. The handle 73 is oriented with respect to a bottom side of the bracket attachment frame 64 at an obtuse first orientation angle 69. The cushion-containing head 79 is tilted with respect to the proximal handle end 87 at an acute second orientation angle 71. The cushion-containing head 79 includes a quantity of a plastic foam material. The cushion-containing head 79 includes retention strips 81 for retaining the plastic foam material.

To support a bouquet holder assembly 31 of the invention on a table 61, an adjustable clamp assembly 12, such as disclosed in U.S. Pat. No. 5,456,046, is clamped onto the table 61. Therefore, the present invention can be regarded as a combined vit and handle-containing bouquet holder. A skirt 63 of a tablecloth can be hung from a skirt holder assembly 40 attached to the adjustable clamp assembly 12. The bouquet holder assembly 31 is obtained, and the bracket attachment channel 66 is aligned with the module holder portion 28 of the bracket assembly 26. Then, the bouquet holder assembly 31 is lowered so that the bracket attachment frame 64 supports the bouquet holder assembly 31 on the module holder portion 28.

Also, the bouquet holder assembly 31 can be carried by a person and used as follows. A bouquet 81, shown in FIG. 6, that has a pin, can be attached to a cushion-containing head 79 having any suitable shape, by placing the pin into the cushion-containing head. The handle 73 can be grasped by a person, such as a bride, and the handle 73 can be used for holding the pinned bouquet 81. The second orientation angle 71, of the cushion-containing head 79 with respect to the handle 73 allows for a pinned bouquet to face forward as the bride carries the bouquet. Preferably, the second orientation angle 71 is approximately forty-five degrees. After the bride is finished carrying the bouquet 81, the bracket attachment channel 66 is aligned with the module holder portion 28 of the bracket assembly 26 connected to the adjustable clamp assembly 12 which is clamped onto the table 61. Then, the bouquet holder assembly 31 is lowered so that the bracket attachment frame 64 supports the bouquet holder assembly 31 on the module holder portion 28. If and when desired, the bracket attachment frame 64 can be pulled off of the module holder portion 28, and the handle 73 can be used again for carrying the bouquet 81 pinned to the cushion-containing head 79. The first orientation angle 69 helps tilt the cushion-containing head 79 upward when the bouquet holder assembly 31 is supported by the module holder portion 28 on the table 61.

The components of the bouquet holder assembly for bouquet display apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved bouquet holder assembly for bouquet display apparatus that is low in cost, relatively simple in design and operation, and which may advantageously be used to permit the alternate receipt of a variety of handle-containing bouquet holders. With the invention, a bouquet holder assembly for bouquet display apparatus is provided which includes a single modular structure which permits the alternate receipt of a variety of handle-containing bouquet holders. With the invention, a bouquet holder assembly for bouquet display apparatus provides bouquet holders which have tapered handles which fit into the modular handle-receiving structure for providing a wedging fit between the handle and the handle-receiving structure. With the invention, a bouquet holder assembly for bouquet display apparatus provides a structure that receives the pins of pin-containing bouquets. With the invention, a bouquet holder assembly for bouquet display apparatus provides a pin-receiving structure which can be tilted at a desired display angle for displaying the pinned on bouquet.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A bouquet holder module for a bouquet display apparatus which includes an adjustable clamp assembly and a bracket assembly supported by the adjustable clamp assembly, wherein the bracket assembly includes a module holder portion, comprising:

a bracket assembly attachment portion which includes a bracket attachment frame and a bracket attachment channel defined by said bracket attachment frame, and a bouquet retention portion connected to said bracket assembly attachment portion, wherein said bouquet retention portion includes a bouquet retention frame and bouquet retention channel defined by said bouquet retention frame, wherein said bouquet retention frame includes a planar first interior wall, a planar second interior wall projecting perpendicularly from a first end of said planar first interior wall, a planar third interior wall projecting perpendicularly from a second end of said planar first interior wall, a planar fourth interior wall projecting inward and perpendicular from said planar second interior wall, a planar fifth interior wall projecting inward and perpendicular from said planar third interior wall, and a curved sixth interior wall extending from an innermost end of said planar fourth interior wall to an innermost end of said planar fifth interior wall.

2. The holder module of claim 1, further including:

a bouquet holder assembly supported by said bouquet holder module.

3. The holder module of claim 2 wherein said bouquet holder assembly includes:

an insertion shaft/handle, and a cushion-containing head supported by said insertion shaft/handle.

4. The holder module of claim 3 wherein said cushion-containing head is tilted in a direction away from the adjustable clamp assembly.

5. The holder module of claim 3 wherein said cushion-containing head is comprised of a plastic foam material.

6. The holder module of claim 3 wherein said cushion-containing head is tilted approximately forty-five degrees with respect to said insertion shaft/handle.

7. The holder module of claim 3 wherein said insertion shaft/handle is tapered for ease of initial insertion into said bouquet retention channel and for a wedging action when inserted further into said bouquet retention channel.

8. The holder module of claim 3 wherein said cushion-containing head is in a form of a hemisphere.

9. The holder module of claim 3 wherein said cushion-containing head is in a form of a cylinder.

10. A bouquet holder assembly for a bouquet display apparatus which includes an adjustable clamp assembly and a bracket assembly supported by the adjustable clamp assembly, wherein the bracket assembly includes a module holder portion, comprising:

a bracket assembly attachment portion which includes a bracket attachment frame and a bracket attachment channel defined by said bracket attachment frame, a handle which includes a proximal handle end connected to said bracket attachment frame, and a cushion-containing head supported by said handle.

11. The holder assembly of claim 10 wherein said handle is oriented with respect to a bottom side of said bracket attachment frame at an obtuse first orientation angle.

12. The holder assembly of claim 11 wherein said cushion-containing head is tilted with respect to said proximal handle end at an acute second orientation angle.

13. The holder assembly of claim 10 wherein said cushion-containing head includes a quantity of a plastic foam material.

14. The holder assembly of claim 13 wherein said cushion-containing head includes retention strips for retaining said plastic foam material.

* * * * *